(12) United States Patent
Talgorn et al.

(10) Patent No.: US 12,377,593 B2
(45) Date of Patent: Aug. 5, 2025

(54) 3D PRINTING DEVICE AND METHOD

(71) Applicant: SIGNIFY HOLDING B.V., Eindhoven (NL)

(72) Inventors: Elise Claude Valentine Talgorn, Eindhoven (NL); Manuela Lunz, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 17/945,450

(22) Filed: Sep. 15, 2022

(65) Prior Publication Data

US 2023/0014767 A1 Jan. 19, 2023

Related U.S. Application Data

(62) Division of application No. 15/577,755, filed as application No. PCT/EP2016/061922 on May 26, 2016, now abandoned.

(30) Foreign Application Priority Data

May 29, 2015 (EP) .................................. 15169932

(51) Int. Cl.
*B29C 48/14* (2019.01)
*B29C 64/118* (2017.01)
(Continued)

(52) U.S. Cl.
CPC .......... *B29C 48/147* (2019.02); *B29C 64/118* (2017.08); *B29C 64/209* (2017.08);
(Continued)

(58) Field of Classification Search
None
See application file for complete search history.

(56) References Cited

U.S. PATENT DOCUMENTS 4,302,094 A * 11/1981 Gundlach .............. G03G 15/08
430/102
5,688,464 A * 11/1997 Jacobs ................... B33Y 10/00
427/601
(Continued)

FOREIGN PATENT DOCUMENTS

CN 103462725 A 12/2013
EP 0833237 B1 9/2001
(Continued)

OTHER PUBLICATIONS

BYJU's Displacement in 1-D/ What is the difference between a linear motion and a translatory motion? Mar. 20, 2024—https://byjus.com/question-answer/what-is-the-difference-between-a-linear-motion-and-a-translatory-motion/): (Year: 2024).*
(Continued)

*Primary Examiner* — Abbas Rashid
*Assistant Examiner* — Wayne K. Swier

(57) ABSTRACT

The invention provides a 3D printing device (500) comprising a printer nozzle (502) for depositing a material on a support structure (550) for the formation of a 3D object (10), wherein the printer nozzle (502) and the support structure (550) are arranged to be translated relative to each other with a translation speed in a translation direction (52, 62), and a vibration actuator arranged for providing a vibrating motion (50, 60) of at least a first part of the support structure (550) relative to the printer nozzle (502) in a direction different from the translation direction (52, 62).

16 Claims, 5 Drawing Sheets

(51) Int. Cl.
  *B29C 64/209* (2017.01)
  *B29C 64/245* (2017.01)
  *B33Y 10/00* (2015.01)
  *B33Y 30/00* (2015.01)
  *B33Y 40/00* (2020.01)

(52) U.S. Cl.
  CPC ............ B29C 64/245 (2017.08); B33Y 40/00 (2014.12); *B33Y 10/00* (2014.12); *B33Y 30/00* (2014.12)

(56) References Cited

U.S. PATENT DOCUMENTS

| | | | |
|---|---|---|---|
| 6,106,146 A * | 8/2000 | Langecker | B29C 48/08 366/338 |
| 2005/0267628 A1 | 12/2005 | Crowder et al. | |
| 2009/0025638 A1 | 1/2009 | Inoue | |
| 2010/0134542 A1 | 6/2010 | Hill | |
| 2014/0361460 A1 | 12/2014 | Mark | |
| 2015/0024169 A1 | 1/2015 | Martin | |
| 2015/0064142 A1 | 3/2015 | Green et al. | |
| 2016/0288265 A1 | 10/2016 | Suzuki et al. | |
| 2017/0282462 A1 | 10/2017 | Abe et al. | |
| 2018/0326660 A1 | 11/2018 | Gifford et al. | |

FOREIGN PATENT DOCUMENTS

| | | | | |
|---|---|---|---|---|
| JP | H0355224 A | | 3/1991 | |
| JP | 11267487 A | * | 10/1999 | .......... B01F 11/0022 |
| JP | 2000025118 A | | 1/2000 | |
| JP | 2003159755 A | | 6/2003 | |
| JP | 2014104683 A | | 6/2014 | |
| JP | 2015196252 A | | 11/2015 | |
| WO | 2007050972 A2 | | 5/2007 | |
| WO | 2015026299 A1 | | 2/2015 | |
| WO | 2015077195 A2 | | 5/2015 | |

OTHER PUBLICATIONS

Machine translation JPH11267487A (Year: 1999).*
Machine translation JP2014104683A (Year: 2014).*
Machine translation CN103462725A (Year: 2013).*
Machine translation JP2015196252A (Year: 2015).*

* cited by examiner

3D PRINTING DEVICE AND METHOD

CROSS-REFERENCE TO PRIOR APPLICATIONS

This application is a divisional of U.S. Ser. No. 15/577,755, filed on Nov. 28, 2017, which is a U.S. National Phase application under 35 U.S.C. § 371 of International Application No. PCT/EP2016/061922 filed on May 26, 2016, which claims the benefit of European Patent Application No. 15169932.9, filed on May 29, 2015. These applications are hereby incorporated by reference herein.

FIELD OF THE INVENTION

The invention relates to a 3D printing device and 3D printing method for manufacturing a 3D object.

BACKGROUND OF THE INVENTION

Fused deposition modeling (FDM) is known in the art. EP0833237 describes for example an apparatus incorporating a movable dispensing head provided with a supply of material which solidifies at a predetermined temperature, and a base member, which are moved relative to each other along X-, Y-, and Z-axes in a predetermined pattern to create three-dimensional objects by building up material discharged from the dispensing head onto the base member at a controlled rate. The apparatus is preferably computer driven in a process utilizing computer aided design (CAD) and computer aided manufacturing (CAM) software to generate drive signals for controlled movement of the dispensing head and base member as material is being deposited, or dispensed. Three-dimensional objects may be produced by depositing repeated layers of solidifying material onto each other until the shape is formed. Any material, such as self-hardening waxes, thermoplastic resins, molten metals, two-part epoxies, foaming plastics, and glass, which adheres to the previous layer with an adequate bond upon solidification, may be utilized. Each layer base is defined by the previous layer, and each layer thickness is defined and closely controlled by the height at which the tip of the dispensing head is positioned above the preceding layer. The base member is moved laterally along X- and Y-axes of a base plane and the dispensing head is moved perpendicular to the base plane along the Z-axis.

WO-2007050972 discloses a nozzle for extruding a material to construct a structure, the nozzle having multiple outlets for extruding material. To cause the material to flow more smoothly through one or more of the outlets, a vibration-generating device is mounted to the nozzle, and arranged to generate vibrations that are perpendicular to the flow of material, parallel to the follow, at another angle with respect to the flow, or at more than one angle with respect to the flow.

Additive manufacturing (AM), or 3D printing, is a growing field of materials processing. It can be used for rapid prototyping, customization, late stage configuration, or making small series in production.

The resolution of the filaments produced by present FDM printers is limited by the diameter of the extruded filament which is presently at least about 0.3 mm. In order to create feature dimensions smaller than about 0.1 mm, for example a pattern on the surface of the 3D object with relative small feature dimensions (e.g. in order to increase roughness for an improved grip) different manufacturing techniques are required, such as stereo lithography which is limited to light-sensitive materials such as photopolymers, e.g. acrylates. Furthermore, to achieve the smallest resolution, which may be in the order of 0.1 mm along a plane of the support structure (XY-plane) and in the order of 0.02 mm perpendicular to this plane (along the Z-axis), the speed of the printing process needs to be lowered to enable, for example, accurate alignment of the dispensing head with respect to a previously or earlier printed layer. At a relatively high speed the accuracy of the positioning of the dispensing head with respect to the support structure is lower, especially in case of non-linear movements of the dispensing head. Thus a lower speed is required to increase the accuracy which leads to an increase in manufacturing time of 3D printed objects.

SUMMARY OF THE INVENTION

Hence, it is an aspect of the invention to provide a 3D printer and a method of manufacturing a 3D object that may provide for relatively small feature sizes with a minimal influence on the manufacturing time.

Hence, in a first aspect the invention provides a 3D printing device, especially a fused deposition modeling 3D printing device, wherein the 3D printing device comprises a support structure, a printer nozzle for depositing a material on the support structure for the formation of a 3D object, wherein the printer nozzle and the support structure are arranged to be translated relative to each other with a translation speed in a translation direction, and a vibration actuator arranged for providing a vibrating motion of at least a first part of the support structure relative to the printer nozzle in a direction different from the translation direction.

The terms "vibration" and "vibrating" refer to a periodic motion in opposite directions, e.g. a movement back and forth or up and down.

The 3D printing device is arranged to provide a basic printed pattern through depositing, or dispensing, a material on a support structure and (at the same time) providing a relative translation of the support structure with respect to the printer nozzle. This relative translation may be a translation of only the support structure, while the printer nozzle does not move and is fixated at one position, or a translation of only the printer nozzle, while the support structure does not move and is fixated at one position, or a combination of movements of both the support structure and the printer nozzle. A vibrating motion of at least a first part of the support structure of the 3D printing device is added, or superposed, to the relative translation. The vibrating motion has a different direction with respect to the translation direction. In this way a periodic pattern (through the vibrating motion) is added to the basic (translation induced) pattern. Thus, the vibrating motion provides for a second order (additional) periodic movement of at least a part of the support structure next to the (first order) relative translating movement of the support structure with respect to the printer nozzle. As the vibrating motion has (and is characterized by) a vibration frequency, vibration amplitude and vibration direction, the dimension and the form, or shape, of the pattern that is created at the first part of the support structure (i.e. the part that experiences the vibrating motion in addition to the translating movement) by depositing material from the printer nozzle, is determined by at least a combination of the translation speed, the vibration frequency and the vibration amplitude and the normal printing parameters, such as the speed of dispensing and the material that is dispensed). The vibrating motion enables to create relatively small sized features in addition to the basic pattern that is created by the (relative) translating motion. In this way there is no need to decrease the translation speed to provide for an improved accuracy or alignment in order to create features with relatively small dimensions.

The pattern (or shape) of the printed or deposited material will be periodic with a period that depends on the frequency of the vibrating motion and will have an amplitude that depends on the amplitude of the vibrating motion and on an angle between the translation direction and the direction of the vibrating motion. When the direction of the vibrating motion is in the same plane as the relative translation of the printer nozzle and the support structure, the amplitude of the pattern of the printed or deposited material will be equal to the amplitude of the vibrating motion times the absolute value of the sinus of the angle between the translation direction and the direction of the vibrating motion. In case the relative translation of the printer nozzle and the support structure is in an X-Y plane and the direction of the vibrating motion is perpendicular to the X-Y plane, thus in a direction along the Z-axis (the Z-direction), then the pattern of printed or deposited material will have an amplitude in the Z-direction and will be at maximum the amplitude of the vibrating motion. In this case it is also possible that the pattern of printed or deposited material will have an additional amplitude in the X-Y plane which will have a smaller value than the amplitude in the Z-direction.

The terms "3D printed object" or "3D object" refer to a three-dimensional object obtained via 3D printing (which is an additive manufacturing process), such as an object having a height, a width and a length. The 3D (or 3DP) object can in principle be any object that is 3D printable. It can be an item with a use function or a purely decorative item. It can be a scale model of an item such as a car, a house, a building, etc. Further, the 3D object can be a piece or element for use in another device or apparatus, such as a lens, a mirror, a reflector, a window, a collimator, a waveguide, a color converting element (i.e. comprising a luminescent material), a cooling element, a locking element, an electrically conducting element, a casing, a mechanical support element, a sensing element, etc. The 3D printed object comprises 3D printed material.

Additive Manufacturing (AM) is a group of processes making three-dimensional objects from a 3D model or another electronic data source primarily through additive processes. Hence, the term "3D printing" is substantially equivalent to "additive manufacturing" or "additive manufacturing method". The additive process can involve the binding of grains (via sintering, melting, or gluing) or of layers of material (via successive deposition or production of the layers, e.g. polymerization), etc. A widely used additive manufacturing technology is the process known as Fused Deposition Modeling (FDM). Fused deposition modeling (FDM) is an additive manufacturing technology commonly used for modeling, prototyping, and production applications. FDM works on an "additive" principle by laying down material in layers; a plastic filament or metal wire is unwound from a coil and supplies material to produce a part. Possibly, (for thermoplastics for example) the filament is melted and extruded before being laid down. FDM is a rapid prototyping technology. Another term for FDM is "fused filament fabrication" (FFF). Herein, the term "filament 3D printing" (FDP) is applied, which is considered to be equivalent to FDM or FFF. In general, FDM printers use a thermoplastic filament, which is heated to its melting point and then extruded, layer by layer (or in fact filament after filament) to create a three-dimensional object. FDM printers can be used for printing a complicated object.

Hence, in an embodiment the method includes production of the 3D printed object via FDM 3D printing.

The 3D printed object is especially (at least partly) made from 3D printable material (i.e. material that may be used for 3D printing).

Materials that may especially qualify as 3D printable materials may be selected from the group consisting of metals, glasses, thermoplastic polymers, silicones, etc. Especially, the 3D printable material comprises a (thermoplastic) polymer selected from the group consisting of ABS (acrylonitrile butadiene styrene), Nylon (or polyamide), Acetate (or cellulose), PLA (poly lactic acid), terephthalate (such as PET polyethylene terephthalate), Acrylic (polymethylacrylate, Perspex, polymethylmethacrylate, PMMA), Polypropylene (or polypropene), Polystyrene (PS), PE (such as expanded-high impact-Polythene (or polyethene), Low density (LDPE) High density (HDPE)), PVC (polyvinyl chloride) Polychloroethene, etc. Optionally, the 3D printable material comprises a 3D printable material selected from the group consisting of Urea formaldehyde, Polyester resin, Epoxy resin, Melamine formaldehyde, Polycarbonate (PC), rubber, etc. Optionally, the 3D printable material comprises a 3D printable material selected from the group consisting of a polysulfone, a polyether sulfone, a polyphenyl sulfone, an imide (such as a poly ether imide) etc.

In general these printable (polymeric) materials have a glass transition temperature $T_g$ and/or a melting temperature $T_m$. The 3D printable material will be heated by the 3D printer before it leaves the nozzle (assuming e.g. FDM) to a temperature of at least the glass transition temperature, and in general at least the melting temperature. Hence, in an embodiment the 3D printable material comprises a thermoplastic polymer, such as having a glass transition temperature $T_g$ and/or a melting point $T_m$. Specific examples of materials that can be used (herein) are e.g. selected from the group consisting of acrylonitrile butadiene styrene (ABS), polylactic acid (PLA), polycarbonate (PC), polyamide (PA), polystyrene (PS), lignin, rubber, etc.

The term "printable material" may also refer to a plurality of different 3D printable materials. The term "printable material" especially refers to material that can be printed. For instance, in the case of FDM the printable material may comprise a heated polymer that is flowable. The printable material may be solid at room temperature, but upon heating may become printable (i.e. especially flowable). This heating is especially intended to provide a flowable or printable material. In the case of inkjet printing, the printable material may comprise particles in a liquid (that may (be) evaporate (d) after deposition).

The term "printed material" especially herein refers to printable material that has been deposited or printed. Hence, the term "printable material" herein especially refers to the material not (yet) dispensed, deposited or printed. The printing may, amongst others, also include a curing. For instance, printed material may be cured (e.g. by heating with light or another heat source) after being deposited, followed by further printing on the cured printed material.

In an embodiment of the 3D printing device according to the invention, the support structure extends along a support structure plane, wherein the translation direction is parallel to the support structure plane, and wherein the vibrating motion is in a direction parallel and/or perpendicular to the support structure plane. In this way the vibrating motion provides for periodic features to be created and added to the basic pattern of printed material in three directions. The basic pattern is the pattern that is created by the relative translation of the printer nozzle and the support structure.

The direction of the vibrating motion, and thus the amplitude, may be parallel to the X-Y plane, i.e. the plane in which the support structure extends, or in the Z-direction, i.e. in a direction perpendicular to the support structure. The direction of the vibrating motion may also vary in time, for example during a first time period the vibrating motion is along a first direction in the X-Y plane, during a second time period the vibrating motion is along a second direction in the X-Y plane and during a third time period the vibrating motion is along the Z-direction, or any other combination. In this way relatively small size features may be created in different directions.

In an embodiment of the 3D printing device according to the invention, the vibrating motion has a vibration frequency, and the printed material has a width, wherein the width multiplied with the vibration frequency divided by the translation speed is larger than 0.5. The width is defined as the shortest distance of the printed material along the XY plane, such as along the plane of the translation direction and/or the plane of the support structure. It can be calculated that the (periodic) pattern of printed (or deposited) material has a period which is equal to the translation speed divided by the frequency of the vibrating motion (in case the printed material does not experience a vibrating motion there will be no periodic pattern and hence no period). In general the pattern period will be larger than zero, but a practical lower limit of the pattern period may be 200% of the width of the printed material (which is the width without the vibrating motion), because otherwise e.g. part of the material from the back and forth movement during the vibrating motion would be deposited in the same location which may result in for example unwanted thickness variations and in this way overlap of printed material during the vibrating motion is avoided in this way and unwanted pattern variations, such as interference patterns, are avoided. Combining this results in that the width multiplied with the vibration frequency divided by the translation speed should be larger than 0.5. For example, a printing speed of 100 mm/sec and a width of the printed material of 0.3 mm results in a maximum frequency of the vibrating motion of 167 Hz to achieve a pattern period of 0.6 mm which is at minimum 200% of the width of the printed material (i.e. twice the width).

In an embodiment of the 3D printing device according to the invention, the vibrating motion has a vibration frequency, and the printed material has a height, wherein the width multiplied with the vibration frequency divided by the translation speed is smaller than 0.5. In this case the vibration direction has an angle with the support structure plane, e.g. is for example perpendicular to the support structure plane. The height (or thickness or extension) is defined as the shortest distance of the printed material in the Z-direction, such as perpendicular to the support plane. Similar to above, it can be calculated that the (periodic) pattern of printed (or deposited) material has a period which is equal to the translation speed divided by the frequency of the vibrating motion (in case the printed material does not experience a vibrating motion there will be no periodic pattern and hence no period). In general the pattern period will be larger than zero, but a practical upper limit of the pattern period may be 200% of the height of the printed material (which is the height without the vibrating motion), because otherwise e.g. part of the printed material may float and is thus not deposited on an previous layer or on the support structure. Combining this results in that the height multiplied with the vibration frequency divided by the translation speed should be smaller than 0.5. A vibrating motion along the Z-direction can also result in a periodic pattern in the XY-plane with an amplitude depending on, amongst others, the amplitude of the vibrating motion with respect to the height of the printed layer.

In an embodiment the pattern period of the printed material induced by the vibrating motion is smaller than 1000 times the width of the printed material. This results in that the width multiplied with the vibration frequency divided by the translation speed is larger than 0.001. A period above this practical upper limit of 1000 times the width of the printed material corresponds to relatively large features that can also be realized with sufficient accuracy by the translating motion itself and for which no separate vibrating motion with a frequency larger than in the order of 10 Hz is required (see also below). For example, a printing speed of 1000 mm/sec and a width of the printed material of 0.3 mm results in a maximum frequency of the vibrating motion of 30 Hz to achieve a pattern period of 30 cm which is at minimum 1000 times the width of the printed material.

In an embodiment of the 3D printing device according to the invention, the vibrating motion has a vibration frequency larger than 10 Hz. For lower values of the frequency of the vibrating motion, the period patterns can also be created by the relative translation of the printer nozzle with respect to the support structure, and at frequencies above around 10 Hz the additional vibrating motion will greatly improve the accuracy of the printed periodic pattern.

In an embodiment of the 3D printing device according to the invention, the vibration actuator is arranged to provide a first vibrating motion of the first part of the support structure and a second vibrating motion of a second part of the support structure, the second vibrating motion being different from the first vibrating motion with respect to vibration frequency and/or vibration amplitude. This provides for creating a 3D object with features sizes (created by the vibrating motion) that depend on the location on the support structure. For example, at the first part of the support structure, corresponding to a first part of the printable 3D object, the vibrating motion provides features sizes in the order of 0.1 mm, and at the second part of the support structure, corresponding to a second part of the printable 3D object, the vibrating motion provides feature sizes in the order of 0.05 mm. Optionally, another part (than the first and second part) of the support structure does not vibrate at all.

In an embodiment of the 3D printing device according to the invention, at least a third part of the support structure is clamped to influence the vibrating motion of the third part of the support structure. In this way the third part of the support structure, corresponding to a third part of the 3D printable object, will for example not vibrate, or will experience a negligible amplitude, such that at the third part of the 3D printable object a shape is created with a basic pattern created only by the relative translation of the support structure with respect to the printer nozzle. The clamping provides for a reduction or restriction of the vibrating motion at the third part of the support structure. In practice the vibration, such as the vibration amplitude, in a direction perpendicular to the support structure plane will be influenced the most by this clamping (i.e. the vibration in the Z-direction).

In an embodiment of the 3D printing device according to the invention, the vibration actuator is arranged to provide the support structure with a vibration pattern with a frequency and amplitude that varies over the support structure according to a vibration pattern. In this way the vibration frequency and the vibration amplitude depend on the location on the support structure, and thus the 3D object will have a pattern with periodic features that depend on the position of the printable 3D object on the support structure corresponding to the vibration pattern. For example, the vibration actuator may comprise a plurality of vibration sources each acting on a different part of the support structure thereby providing a predetermined vibrating motion at the different parts of the support structure. Especially the vibration, such as the vibration amplitude, in a direction perpendicular to the support structure will be influenced the most by this embodiment (i.e. the vibration in the Z-direction).

In an embodiment of the 3D printing device according to the invention, the vibration actuator is an ultrasound actuator. The ultrasound actuator can advantageously provide for a vibration pattern depending on the properties of the support structure, such as mass, size, etc. that determine resonance frequencies of the support structure.

In an embodiment of the 3D printing device according to the invention, the 3D printer further comprises a processor arranged to control the vibrating motion of the support structure and the relative translation of the printer nozzle with respect to the support structure. In this way the translating and vibrating motions can be aligned to each other. Advantageously the processor comprises instructions for different time periods with regard to the translation speed and direction, pausing periods (e.g. at the end of a printed layer), the vibration frequency and the vibration amplitude and direction.

In an embodiment of the 3D printing device according to the invention, the support structure comprises a vibration plate, the vibration actuator being arranged to provide a vibrating motion to the vibration plate. In general this results in that the vibration actuator has to provide the vibrating motion to a smaller (less mass) structure, which is more energy efficient and may provide for a faster and more accurate vibrating motion.

In a second aspect the invention provides a method for manufacturing a 3D object, especially a fused deposition modeling method for manufacturing a 3D object, wherein the method comprises the steps of: depositing a material from a printer nozzle on a support structure while translating the support structure and the printer nozzle relative to each other with a translation speed in a translation direction, and vibrating at least a first part of the support structure relative to the printer nozzle in a direction different from the translation direction.

Advantages and variations of the first aspect of the invention similarly apply to this second aspect of the invention, and vice versa.

In an embodiment of the method according to the invention, the frequency and/or amplitude and/or the direction of the vibrating motion varies as a function of time. This provides for an additional degree of freedom in creating a specific shape or pattern of the 3D object.

In an embodiment of the method according to the invention, the vibrating motion between subsequent disposed material layers is in phase. The vibrating motion being in phase between subsequent layers means that the amplitude and frequency of subsequently deposited layers (on top of each other) are similar such that a minimum/maximum of the periodic pattern of a first layer coincides with a minimum/maximum of the periodic pattern of a second subsequent layer deposited, or printed, on the first layer. In this way a fixation or adhesion between these subsequent disposed material layers is maximized. By creating a difference in phase, e.g. a difference in frequency, between subsequent disposed material layers the adhesion or fixation between these subsequent disposed material layers can be tuned.

In an embodiment of the method according to the invention, the method further includes a time delay before depositing a second (subsequent) material layer on top of a first material layer. This provides for example for an optimum alignment between subsequent layers.

In a third aspect the invention provides a computer-readable storage medium instructions that when executed by at least one processor of a 3D printing device causes the printing device to generate a 3D object, or a computer-readable 3D model for use in 3D manufacturing, comprising instructions for depositing a material from a printer nozzle on a support structure, instructions for generating a translating motion of the support structure relative to the printer nozzle with a translation speed in a translation direction, and instructions for generating a vibrating motion of a part of the support structure relative to the printer nozzle in a direction different from the translation direction.

Advantages and variations of the first aspect of the invention similarly apply to this third aspect of the invention, and vice versa.

BRIEF DESCRIPTION OF THE DRAWINGS

Embodiments of the invention will now be described, by way of example only, with reference to the accompanying schematic drawings in which corresponding reference symbols indicate corresponding parts, and in which.

The drawings are not necessarily on scale.

DETAILED DESCRIPTION OF THE EMBODIMENTS

Figure 1:
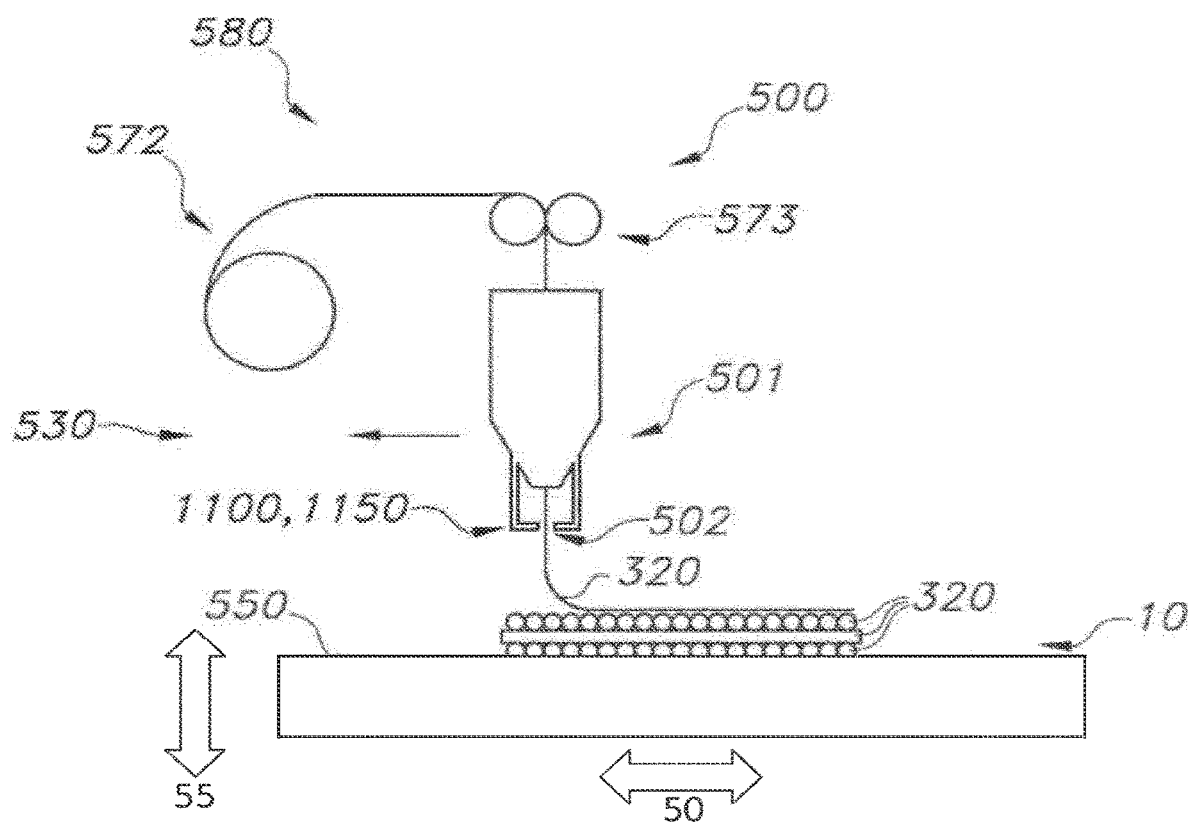
FIG. 1 schematically depicts an embodiment of a 3D printing device according to the invention.

FIG. 1 schematically depicts an embodiment of a 3D printing device, or 3D printer, according to the invention which may for example be used for the advanced manufacturing (AM) method as described herein. A 3D printing device 500 comprises a printer head 501 having a printer nozzle 502 for printing, or depositing, a 3D printable material onto a support structure 550. By way of example, an embodiment of an FDM printer is schematically depicted.

Reference 530 indicates the functional unit configured to print a 3D object, especially FDM 3D printing. This reference may also indicate the 3D printing stage unit. Here, only the printer head 501 for providing 3D printed material, such as a FDM 3D printer head is schematically depicted. The 3D printer of the present invention may include a plurality of printer heads, though other embodiments are also possible. Reference 320 indicates a filament of printable 3D printable material (such as indicated above). For the sake of clarity, not all features of the 3D printer have been depicted, only those that are of special relevance for the present invention. The 3D printer 500 is configured to generate a 3D object 10 by depositing, or depositing, a plurality of filaments 320 on the support structure 550 wherein each filament 320 comprises 3D printable material, such as having a melting point $T_m$. In this example, the 3D printer 500 is configured to heat the filament material upstream of the printer nozzle 502.

This may e.g. be done with a device comprising one or more of an extrusion and/or heating function. Such a device is indicated with reference 573, and is arranged upstream from the printer nozzle 502 (i.e. in time before the filament material leaves the printer nozzle 502). Reference 572 indicates a spool with material, especially in the form of a wire. The 3D printer 500 transforms this in a filament or fiber 320. By arranging filament by filament and filament on filament, the 3D object 10 may be formed. The 3D printing technique used herein is however not limited to FDM (see also above). Reference 580 indicates a storage of the printable material (or a precursor thereof). For example, the spool with material may be used as storage.

The 3D printer 500 further comprises a conversion unit 1100, here by way of example a heater unit 1150. The heater unit 1150 may be functionally coupled to the printer head 501. The heater unit 1150 is especially configured to provide heat to the printable material on the flow (to the support structure 550). Optionally, the heater unit may be comprise a laser.

Arrows 50 and 55 represent the vibrating motion of the support structure 550 respectively parallel to the plane of the support structure 550 (which is also the main translation direction of the support structure 550 and/or the printer nozzle 502) and perpendicular to the support structure 550. The vibrating motion 50, 55 is provided for by a vibration actuator (not shown), such as for example a vibration motor (e.g. linear resonant actuator vibration motor, eccentric rotating mass vibration motor), or a (ultra)sound actuator such as a loudspeaker with an electronic signal generator for acoustic excitation. A controller (not shown) may be arranged to control the (relative) movements, translations and vibrations, of the printer nozzle (printer head) and the support structure. For example, the controller may switch off the vibrating motion for a predetermined amount of time, at a specific position, for a specific layer, etc. In this way a location dependent periodic pattern is printed wherein the amplitude and/or frequency etc. vary over the printed 3D object.

The direction of the vibrating motion 50, i.e. the vibrating motion parallel to the plane of the support structure 550 is generally not in the same direction as the direction of the printing, i.e. the direction of the relative movement, or translation, of the printer nozzle with respect to the support structure. Thus, the vibration, which is a (linear) periodic movement, has an angle different from zero with the (linear) translation. In this way a pattern can be created with (periodic) features depending on the frequency and amplitude of the vibrating motion and depending on the angle between the direction of the vibrating motion and the printing, or translation, direction.

In an embodiment the support structure 550 vibrates at a specific vibration frequency and with a specific vibration amplitude. As a function of time, thus while the material is deposited on the support structure 550, the vibration frequency and/or the amplitude may vary or may be constant. Optionally, the vibrating motion may be absent during a period of time of the printing process.

In another embodiment only a first part of the support structure 550 vibrates. For example, the vibration actuator only actuates or excites, and hence provides a vibrating motion to, the first part of the support structure 550. In a further example, a third part of the support structure 550 is clamped in such a way that it does not vibrate or vibrates to a lesser extent (i.e. a smaller amplitude), for example by using a fixation, or applying a local weight thereby mainly locally suppressing the vibrating motion 55 in the Z-direction, i.e. in a direction perpendicular to the plane defined by the support structure 550, and/or the vibrating motion parallel to the plane of the support structure 550 (XY plane). In another example, the vibration actuator is arranged to provide a vibration pattern onto the support structure in which the vibration frequency and/or vibration amplitude vary as a function of the position on the support structure. This can be implemented, for example, by an (ultra)sound actuator leading to acoustic resonance of the support structure 550. In this way the vibrations can be localized wherein a first part of the support structure vibrates and another part of the support structure does not vibrate or vibrates to a less extent, for example with a smaller amplitude. Alternatively, multiple sources for vibration can act on the support structure at different positions to generate relatively complex vibration patterns.

In an embodiment the support structure comprises a base plate on which a vibration plate is provided and the printable material is deposited on the vibration plate (not shown). The base plate provides for the relative translation and the vibration plate provides for the vibrating motion 50, 55. In this way the energy required to keep the printed object at a certain distance to the printer nozzle and the energy needed for the vibrating motion can be separated and separate actuators can be employed optimized for their specific functions. The vibration plate advantageously is thinner (less mass) than the base plate and thus the energy required for the vibrations is reduced which may result in a more accurate vibrating motion.

The vibrating motion can be varied when depositing a layer, but it can also be varied between subsequent deposited layers, i.e. the vibrating motion while printing a first layer is different while printing the next, subsequent layer on the first layer, for example by setting a different amplitude and/or frequency. The fixation between subsequent layers can be tuned by applying and selecting a specific vibrating motion depending on several characteristics of the printed material itself, e.g. dimensions and material properties etc., the frequency and amplitude of the vibrating motion, the translation speed and other process parameters, such as for example temperature. For example, a first layer is deposited with a first vibration frequency and a first vibration amplitude, and a subsequent layer is deposited with a second vibration frequency and a second vibration amplitude. A vibrating motion perpendicular to support structure (i.e. in the Z-direction) especially may result in an improved adhesion or fixation between subsequently printed layers because at some locations the printer head is closer to the previously deposited layer and hence will press the printable (to be deposited) material onto the (previously) printed layer.

The pattern shape of the printed material will have a pattern period and pattern amplitude (defined as pattern extension perpendicular to the translation direction) as a result of the vibrating motion which period and amplitude are superposed to the basic pattern of the printed material which is provided for by the relative translating motion between the printer nozzle and the support structure and which basic pattern will have a pattern width, defined by the shortest distance of the printed material as measured parallel to the plane of the support structure (and perpendicular to the translation direction), and a pattern height which is defined by the shortest distance of the printed material as measured perpendicular to the plane of the support structure (Z-direction).

Figure 2A:
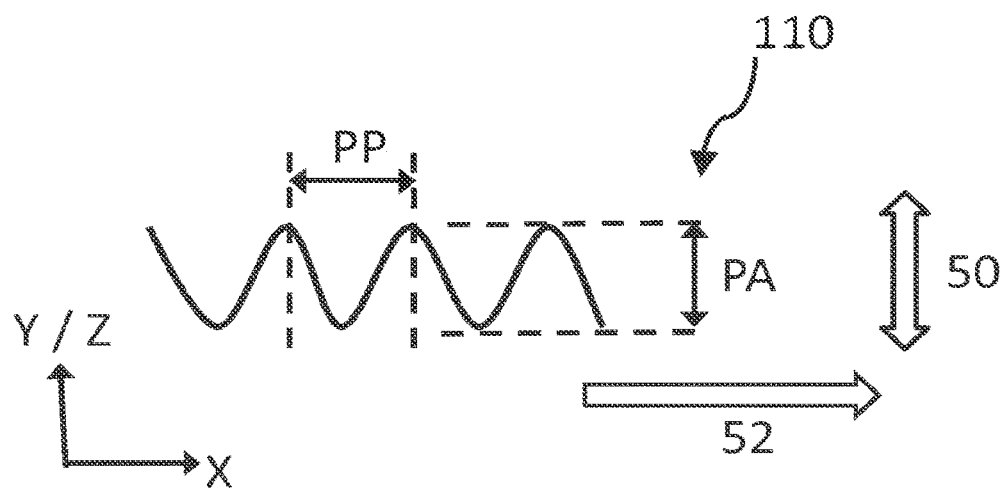
FIGS. 2A-2B schematically depict periodic patterns created with the 3D printing device according to the invention.
Figure 2B:
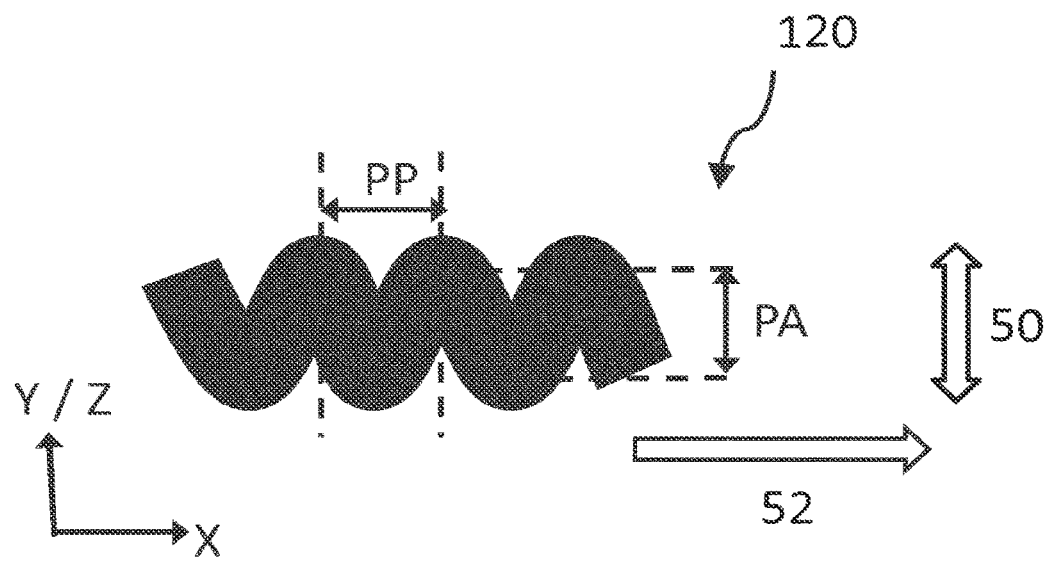

The vibrating motion in the different embodiments is characterized by a vibration period $1/f$, wherein f is the frequency of the vibrating motion, and a vibration amplitude A (unit: meters). FIG. 2A shows a schematic view of a periodic pattern 110 created with the 3D printing device according to the invention of deposited, or printed, material created by a translating motion 52 in the X-direction having a translation, or printing, speed v superposed with a vibrating motion 50 in the Y-direction or in the Z-direction. The printer nozzle prints a continuous line by moving (translating) the support structure 550 with respect to the printer nozzle 502 with the translation speed v. The vibrating motion 50 of the support structure induces periodic movements at the location of the printable material, i.e. where the printable material is dispensed or deposited, which results in a pattern with a shape, or form, which is additionally (next to the relative translating motion 52) determined by the vibration frequency and amplitude. The periodic pattern 110 has a period PP which is equal to the translation, or printing, speed v divided by the frequency f of the vibrating motion 50: PP=v/f. The periodic pattern 110 further has a pattern amplitude PA which is, in this case, equal to the amplitude A of the vibrating motion 50 because the direction of the vibrating motion (in the Y-direction or in the Z-direction) is perpendicular to the direction of the translation. FIG. 2B shows a periodic pattern 120 similar to that shown in FIG. 2A, except that the printed material has a larger width than the periodic pattern 110 shown in FIG. 2A.

Figure 3:
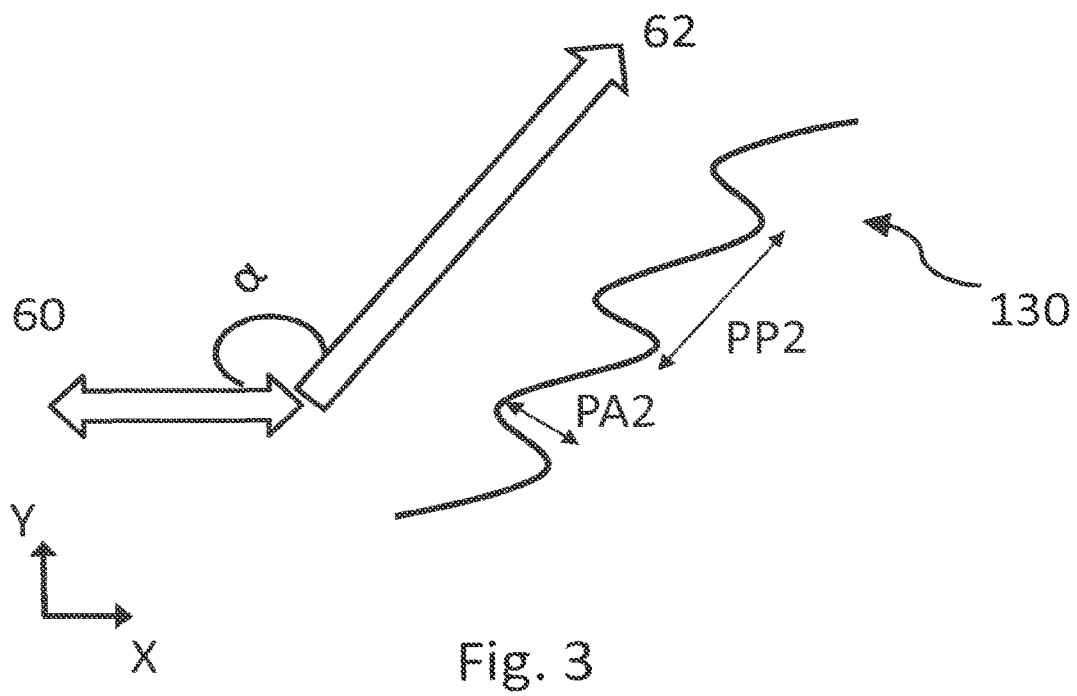
FIG. 3 schematically depicts a periodic pattern created with the 3D printing device according to the invention.

FIG. 3 shows a schematic example of a periodic pattern 130 created with the 3D printing device according to the invention. In this embodiment the direction of a translating motion 62, having a translation speed v, and the direction of a vibrating motion 60 are both in the X-Y plane and have an angle α (different from zero) with respect to each other. The periodic pattern 130 has a period PP2 which is equal to the translation speed v divided by the multiplication of the frequency f of the vibrating motion 60 and the absolute value of the sinus of the angle α: PP2=v/(f*abs(sin(α))). The periodic pattern 130 further has a pattern amplitude PA2 which is, in this case, equal to the amplitude A2 of the vibrating motion 60 multiplied by the absolute value of the sinus of the angle α: PA2=abs(sin(α))*A2.

In an embodiment the width multiplied by the vibration frequency divided by the translation speed is larger than 0.5. It can be calculated that the pattern of printed (or deposited) material has a period which is equal to the translation speed divided by the frequency of the vibrating motion (in case the printed material does not experience a vibrating motion there will be no periodic pattern and hence no period). In general the pattern period will be larger than zero, but a practical lower limit of the pattern period may be 200% of the width of the printed material (which is the width without the vibrating motion), because otherwise e.g. part of the material from the back and forth movement during the vibrating motion would be deposited in the same location which may result in for example unwanted thickness/height variations and thereby overlap of printed material during the vibrating motion is avoided in this way and unwanted pattern variations, such as interference patterns, are avoided. Combining this results in that the width multiplied with the vibration frequency divided by the translation speed should be larger than 0.5. For example, a printing speed of 100 mm/sec and a width of the printed material of 0.3 mm results in a maximum frequency of the vibrating motion of 167 Hz to achieve a pattern period of 0.6 mm which is at minimum 200% of the width of the printed material (i.e. twice the width).

In an embodiment the pattern period of the printed material induced by the vibrating motion is smaller than 1000 times the width of the printed material. This results in that the width multiplied with the vibration frequency divided by the translation speed is larger than 0.001. A width above this practical upper limit of 1000 times the width of the printed material corresponds to relatively large features that can also be realized with sufficient accuracy by the translating motion itself and for which no separate vibrating motion with a frequency larger than in the order of 10 Hz is required (see also below). For example, a printing speed of 1000 mm/sec and a width of the printed material of 0.3 mm results in a maximum frequency of the vibrating motion of 30 Hz to achieve a pattern period of 30 cm which is at minimum 1000 times the width of the printed material.

Figure 4:
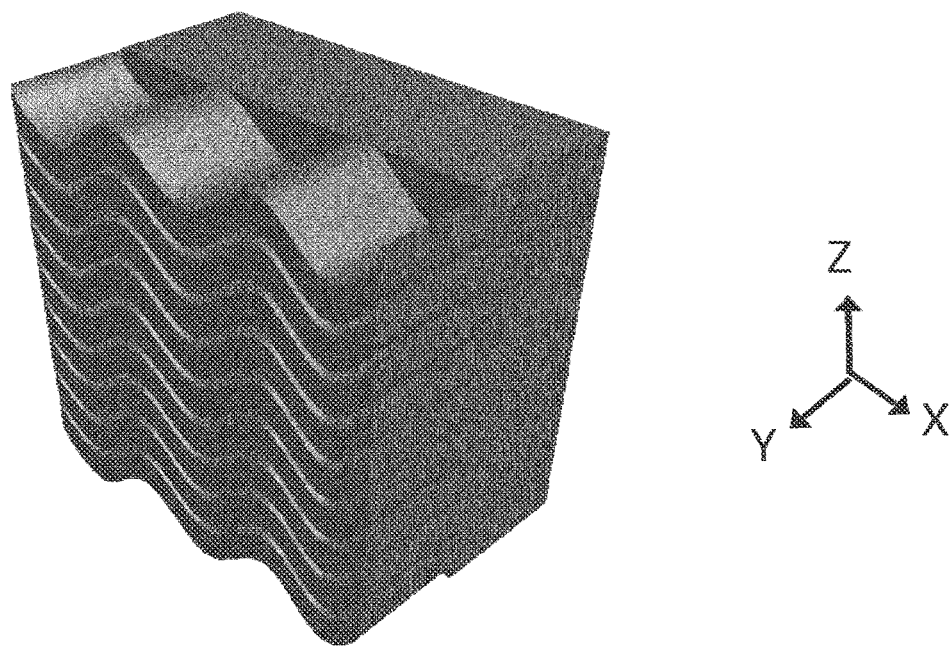
FIG. 4 schematically depicts a periodic pattern created with the 3D printing device according to the invention.

In case of a vibrating motion in a direction perpendicular to a plane defined by the support structure, i.e. in the Z-direction perpendicular to the X-Y plane in which the translating motion is provided, a pattern is provided in which the extension (or height) of the printed material perpendicular to the plane of support structure will exhibit a periodic structure determined at least by the frequency f and amplitude A of the vibrating motion and the translation speed v. FIG. 4 shows a schematic 3D view of such a vibrating motion in the Z-direction resulting in subsequent layers having a periodic pattern in the Z-direction. In practice the amplitude of the vibrating motion should not exceed 200% of the height of the printed material in order to avoid for the nozzle to get in direct contact with the underlying layer. In case there is no layer at the location where the printable material will be deposited this limit may even be lower than 200% of the height of the printed material. Furthermore, preferably subsequently printed layers should exhibit a periodic pattern that is in phase (i.e. having a similar periodic pattern) to avoid pressing the printer nozzle into the previously printed layer. Typically the thickness or height of a printed layer is 0.02 mm to 2 mm. The vibrating motion can cause the height to vary between 0.01 mm and 4 mm.

Figure 5A:
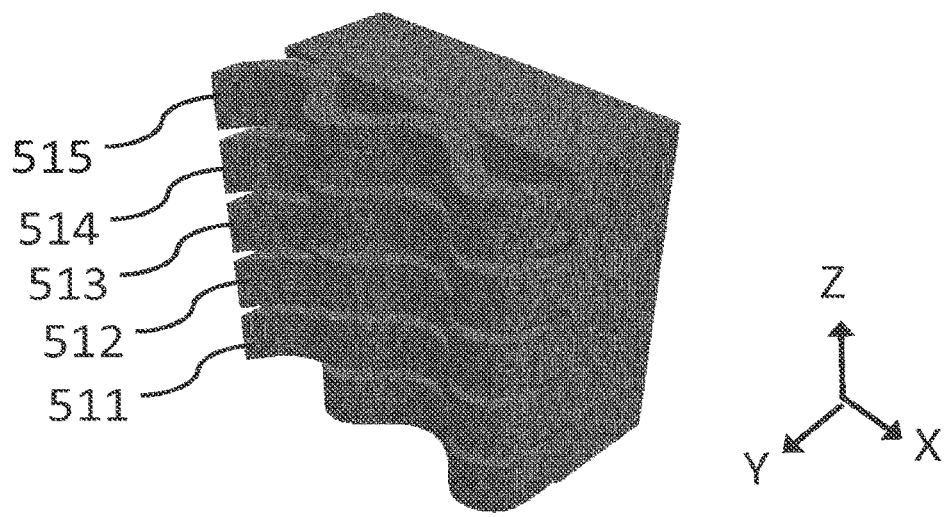
FIG. 5A-5C schematically depict periodic patterns created with the 3D printing device according to the invention.
Figure 5B:
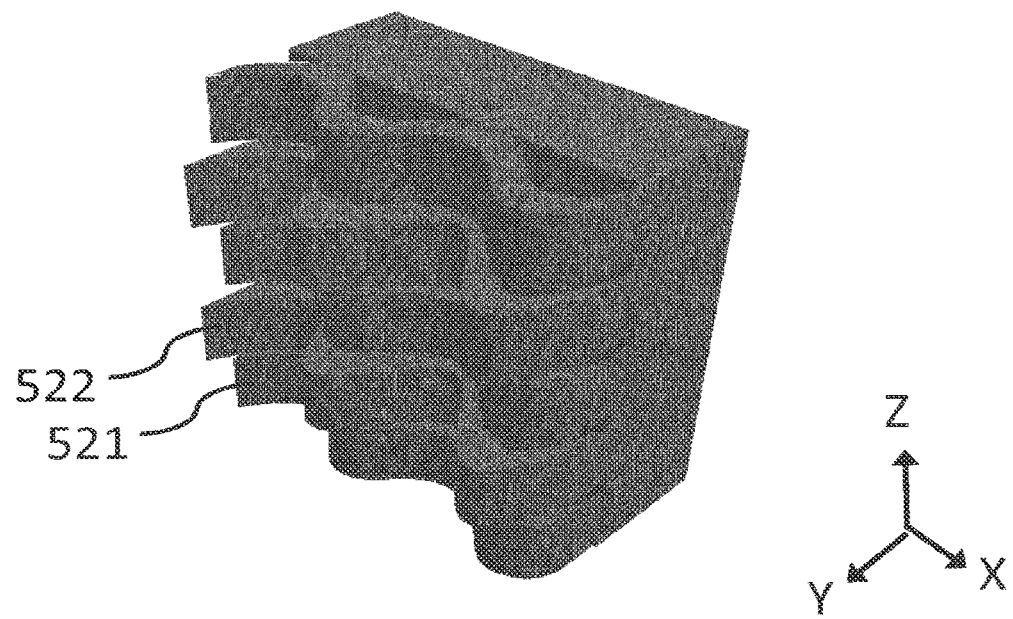
Figure 5C:
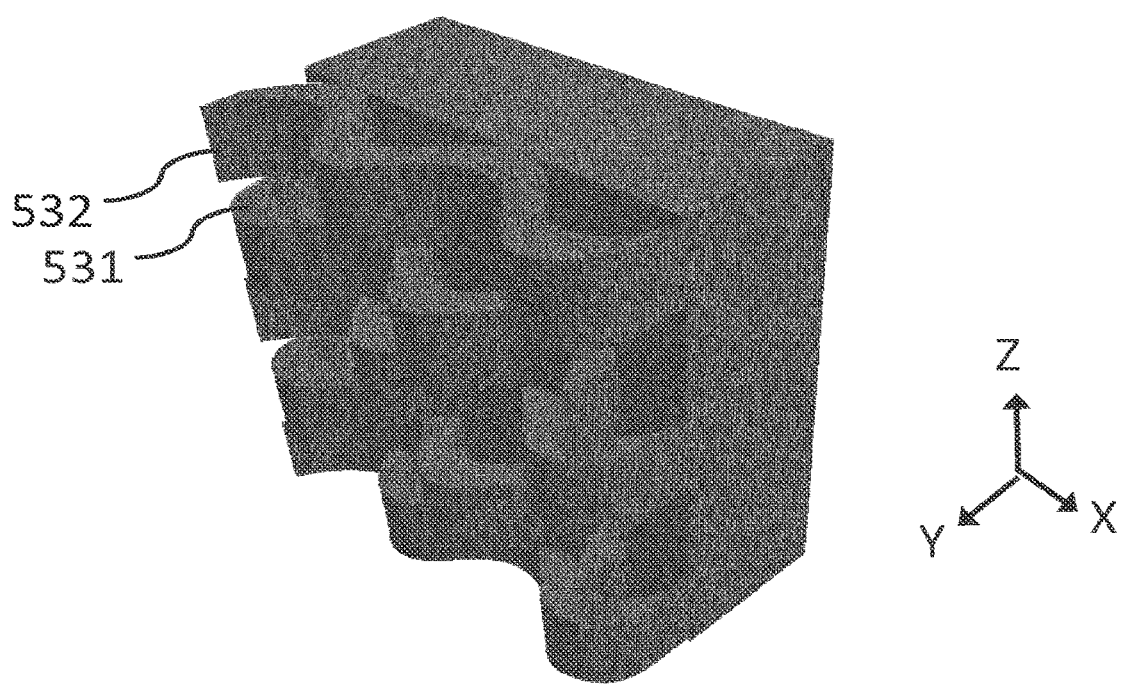

The (additional) vibrating motion of the support structure may be used to improve the adherence properties between adjacent material layers. If the vibrating motion during the deposition of adjacent layers is in phase, the shape of the printed material will be conformal, hence realizing a closely packed print, as is schematically shown in FIG. 5A for five subsequent layers 511, 512, 513, 514, 515. By changing the phase and/or amplitude of the vibrating motion, the amount of overlap and the size of gaps between adjacent material patterns can be tuned, as is schematically shown in FIG. 5B and FIG. 5C. FIG. 5B shows schematically that subsequent or adjacent layers 521, 522 are printed, or deposited with a different amplitude of the vibrating motion, for example layer 521 has a smaller amplitude than adjacent, or subsequent, layer 522. In this way the adherence between adjacently deposited, or dispensed, material can be tuned. Optionally, by including gaps or voids between adjacent lines, which can be provided by having subsequently printed layers with periodic patterns that are out of phase with respect to each other, optical properties of the 3D object can be tuned as well, especially when transparent or translucent materials are used in the printing process. Variations of the surface as well as the adherence, or mechanical connection, between adjacently printed materials may be induced, and/or voids can be formed that will induce scattering or even a sparkling effect. In this way (local) optical effects can be achieved. FIG. 5C shows schematically that subsequently or adjacent printed layers 531, 532 have a different phase, i.e. the peaks (maxima) and valleys (minima) of the adjacent layers 531, 532 do not coincide.

The vibration frequency is in general larger than or equal to 10 Hz. For lower values of the frequency of the vibrating motion, periodic patterns can also be created by the relative translation of the printer nozzle with respect to the support structure, and at frequencies above 10 Hz the additional vibrating motion will greatly improve the accuracy of the printed periodic pattern.

Optionally, a delay time is included when switching to printing of the next (subsequent) layer in order to start a new layer in phase with the previous layer. This delay time can also be used to achieve a specific pattern in the 3D object in the direction perpendicular to the support structure plane, such as a spiraling or zigzag pattern. Specific resonances, such as resonances according to a Chladni pattern, may provide for a localization of the vibrating motion and hence an improved resolution of the resulting periodic pattern.

The term "substantially" herein, such as in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

The invention claimed is:

1. A method for manufacturing a 3D object, the method comprising:
    depositing a material from a printer nozzle on a support structure extending along a support structure plane that is an XY-plane, and while depositing the material:
        translating the support structure relative to the printer nozzle with a translation speed in a translation direction parallel to the support structure plane, and
        vibrating at least a first part of the support structure relative to the printer nozzle in a Z-direction perpendicular to the translation direction.

2. The method according to claim 1, wherein the frequency and/or amplitude and/or the Z-direction of the vibrating varies as a function of time.

3. The method according to claim 1, wherein the vibration has a vibration frequency and the printed material has a width and wherein the width multiplied with the vibration frequency divided by the translation speed is larger than 0.5.

4. The method according to claim 1, further comprising providing the vibration in a direction perpendicular to the support structure plane and having a vibration frequency, wherein the printed material has a height and wherein the height multiplied with the vibration frequency divided by the translation speed is smaller than 0.5.

5. The method according to claim 1, wherein the vibration has a vibration frequency larger than or equal to 10 Hz.

6. The method according to claim 1, further comprising, by a vibration actuator, a first vibrating motion of the first part of the support structure and a second vibrating motion of a second part of the support structure, the second vibrating motion being different from the first vibrating motion with respect to frequency and/or amplitude.

7. The method according to claim 1, further comprising clamping at least a second part of the support structure to influence the vibration of the second part of the support structure.

8. The method according to claim 1, further comprising providing, by a vibration actuator, the support structure with a vibration pattern with a frequency and amplitude that varies over different parts of the support structure.

9. The method according to claim 1, further comprising controlling, by a processor of the 3D printing device, the vibration of the support structure and the translation the support structure.

10. The method according to claim 1, wherein the support structure comprises a vibration plate, and a vibration actuator being arranged to provide a vibrating motion to the vibration plate.

11. The method according to claim 1, wherein the 3D printing device comprising a plurality of vibration actuators.

12. The method according to claim 1, further comprising providing, by a vibration actuator, the vibration at the same time as the printer nozzle deposits the material on the support structure and while the support structure is further translated to form a periodic pattern of the 3D object in addition to a translation induced pattern of the 3D object.

13. The method according to claim 1, further comprising providing, by a vibration actuator, a second vibration to a second part of the support structure relative to the printer nozzle in a direction different from the translation direction, wherein the first vibration is different from the second vibration.

14. The method according to claim 1, further comprising controlling, by a controller of the 3D printing device, the vibration so that the support structure vibrates at a vibrating frequency at the same time as the printer nozzle deposits a thermoplastic filament on the support structure and while the support structure is translated relative to the printer nozzle such that the deposited thermoplastic filament forms a periodic pattern of the 3D object in addition to a translation induced pattern of the 3D object, wherein the periodic pattern has a period corresponding to the vibration frequency.

15. The method according to claim 1, further comprising controlling, by a controller of the 3D printing device, a first vibrating motion and a second vibrating motion provided by a vibrating actuator to provide the first vibrating motion at a first vibrating frequency and the second vibrating motion at a second vibrating frequency at the same time as the printer nozzle deposits a thermoplastic filament on the support structure and while the printer nozzle and support structure are translated relative to each other such that the deposited thermoplastic filament forms a periodic pattern of the 3D object in addition to a translation induced pattern of the 3D object, wherein the periodic pattern has a period corresponding to the vibration frequency.

16. The method according to claim 1, further comprising:
- vibrating the support structure with a first vibration pattern while depositing a first layer; and
- vibrating the support structure with a second vibration pattern while depositing a second layer.

\* \* \* \* \*